Figure 1:
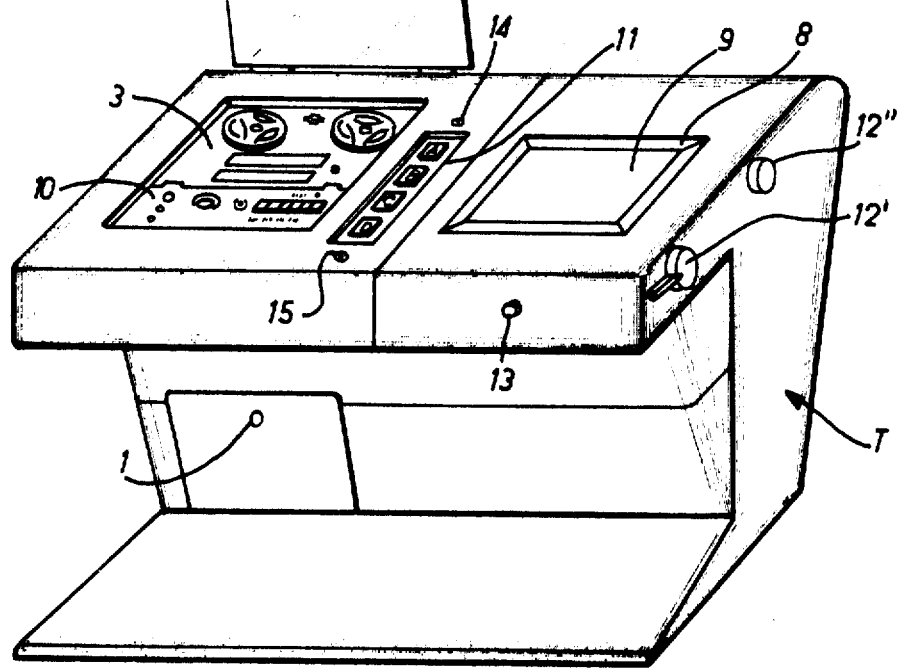

United States Patent
Lucien et al.

[11] 3,886,670
[45] June 3, 1975

[54] AUDIO-VISUAL EDUCATIONAL APPARATUS

[76] Inventors: Rene Lucien, 56 Blvd. Maillot, Neuilly-sur-Seine, France, 92200; Madame Maryvonne LeHenaff, Ker Voa Doue, Louannec, France, 22700

[22] Filed: Dec. 7, 1972

[21] Appl. No.: 313,170

[30] Foreign Application Priority Data
Dec. 8, 1971   France .............................. 71.44086
Aug. 2, 1972   France .......................... 72.27936

[52] U.S. Cl. ....................... 35/9 A; 35/36; 35/48 R
[51] Int. Cl. ............................................. G09b 7/00
[58] Field of Search ............. 35/8 A, 8 R, 9 A, 9 B, 35/9 C, 9 R, 26, 28, 35 C, 36, 48 R, 37, 60; 40/78.05; 360/61, 62, 69, 79, 80

[56] References Cited
UNITED STATES PATENTS

| | | | |
|---|---|---|---|
| 1,559,665 | 11/1925 | Beery et al. | 35/26 |
| 3,266,172 | 8/1966 | Heinberg | 35/35 C X |
| 3,277,588 | 10/1966 | Lynott | 35/9 |
| 3,296,727 | 1/1967 | Liguori | 40/79 |
| 3,416,242 | 12/1968 | Nisbet | 35/48 R |
| 3,629,956 | 12/1971 | Thomas et al. | 35/9 A |
| 3,666,872 | 5/1972 | Powell | 35/9 A |
| 3,718,984 | 4/1971 | Hewitt | 35/9 A |

Primary Examiner—Robert W. Michell
Assistant Examiner—Vance Y. Hum
Attorney, Agent, or Firm—Waters, Schwartz & Nissen

[57] ABSTRACT

A scripto audio-visual educational apparatus having a slide projector, a screen on which images from the slide projector may be displayed, a multi-track tape recorder, circuitry for operating said tape recorder synchronously with the slide projector and means for memorizing selected slides. There is also a roll of translucent paper arranged on said screen for reception of student responses. The roll of paper is adapted for movement relative to the screen by motors and associated control means.

5 Claims, 11 Drawing Figures

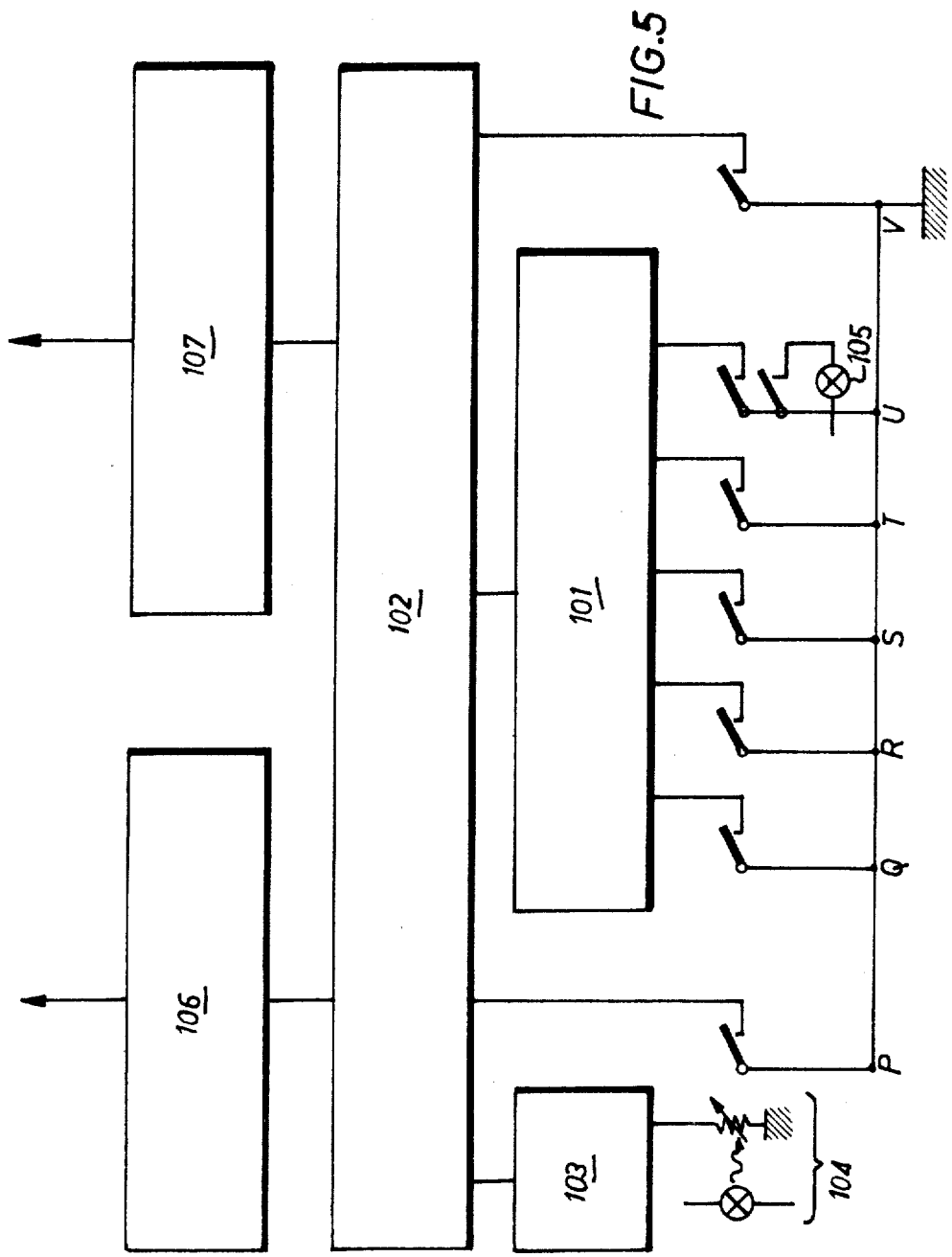

AUDIO-VISUAL EDUCATIONAL APPARATUS

BACKGROUND OF THE INVENTION

The present invention concerns an audio-visual educational apparatus, particularly but not exclusively for the re-education of persons suffering from disturbances in the written or spoken language.

More particularly, the method according to the present invention proposes mechanisation of the re-education method disclosed in French Pat. No. 1,593,072 in the name of Doctor Maryvonne LE HENAFF.

The method according to the above-mentioned French patent is based substantially on the use of a substantial number (from 50 to 120) of colour diapositives or slides, each of them representing an animate or inanimate, etc, isolated object, preferably placed on a plain background, and carrying the inscription of the word corresponding to said object. The characters used to represent the word use a specially developed script.

This method, of which only the operational side will be mentioned, involves the following operations:

1. The pupil sees the diapositives pass before him, and selects therefrom a certain number. For example, he can be asked to select any words containing a given letter.

2. The diapositives preselected in this way are successively projected onto a screen. For each of the diapositives showing an object and the corresponding word, the pupil tries firstly to draw the object and then the script (that is to say the word) corresponding to the object.

3. When this operation has been completed, the selected diapositives or object-word combinations are successively re-projected; for each of the diapositives, the teacher locates firstly the object and the spelling. The pupil then repeats the name of the object and the spelling in its turn.

These two operations are recorded on the magnetic tape of a tape recorder.

4. The pupil successively listens to what the teacher said, and what the pupil himself repeated.

A first difficulty arose when the pupil was not gifted for drawing, and could not achieve satisfactory results. A first improvement comprises replacing the screen by a piece of paper; the pupil could then directly follow the outlines of the drawing and the script (word), but his hand threw a shadow onto the screen, and he was drawing at his side instead of drawing in front of him.

Educational apparatuses are already known which permit images projected onto a screen on which a sheet of paper has been placed, to be traced onto the sheet. In the known apparatuses, the sheet of paper can move across the screen, from a roller.

The known apparatuses of this kind suffer from many disadvantages. For example, they do not have any memory, which makes it impossible to pre-selected prefer diapositives or object-word combinations; they are not equipped with a tape recorder with at least two tracks, which is synchronised with the projector for projecting the slides.

The invention aims to overcome these various disadvantages and to automate the sequence of operations.

The audio-visual apparatus according to the present invention is provided more particularly for application of the principles disclosed in the above-mentioned French patent and, generally, for teaching any disciplines in which it is desirable for the pupil to work with a pencil in his hand.

In other words, the object of the audio-visual assembly is to permit the reproduction by tracing either of an image or of various signs and in particular writing, so that the user can be instructed in anything which interests him, with a pencil in his hand.

This general idea leads in practice to numerous embodiments, according to the use to which the audio-visual educational apparatus according to the invention will be applied.

The present application describes embodiments of the apparatus.

A first embodiment relates to the use of the apparatus according to the invention for the re-education of those who suffer from a defect in written or spoken language.

The apparatus, which is suited more particularly for the re-education method described in the above-mentioned French patent, has the following features:

In a first phase, after having initiated the movement of the diapositives in front of him, at intervals whose duration is established by the re-educator, the patient can carry out a selection of a certain number of diapositives, having a common feature which has been pointed out to the patient; for example, any objects whose name contains the letter "*i*" can be selected.

This pre-selection having been effected, the apparatus is returned to its initial state and, by a supplementary operation, the patient can call up, one by one, the diapositives which he selected and which have been memorised in the preparatory operation.

The use of the diapositives is simultaneous with use of the tape recorder, the latter being the means for dialogue between the re-educator and the patient. In this particular case, it is not necessary for there to be synchronisation between the magnetic tape and the corresponding diapositives as, for each of the successive operations, dialogue is directly between the re-educator and the patient.

The purpose of the magnetic tape is therefore limited to permitting the patient to listen, as often as he wishes, to the words pronounced by the re-educator and the words which the patient repeated after the re-educator.

Another embodiment of the apparatus accoding to the invention lies in an apparatus which is used, not for re-educating, but for teaching.

In this use, the magnetic tape forms a soft-ware element and, because of this, so that the apparatus can be used independently of the teacher, there must be synchronisation between each diapositive and the part of the magnetic tape which corresponds on the one hand to what was said by the teacher and on the hand to what the pupil repeated on the track in question.

It can be mentioned at this point that, for some uses, it may be desirable for the screen to be vertical, when the operation involved is for example recycling workers in a production chain.

In this case, the purpose of the paper can be episodic. It is nonetheless of great interest, for it permits, at the moment of a given operation any particular point which the person interested may wish to retain in documentary form, to be noted by tracing.

The invention also envisages the use of the educational apparatuses under conditions similar to those used by a certain number of language laboratory booths which are connected to a teaching desk, which permits the teacher to monitor the pupils and to open a conversation with those who need particular explanation.

In accordance with the present invention, the audiovisual apparatus is characterised in that it comprises in combination a projector for projecting diapositives onto a screen to which there can be applied a sheet of paper, a tape recorder having at least two tracks, which can operate in synchronism with said projector, and means for memorising the selected diapositives, which means acts on the projector alone or on the projector and the tape recorder, by way of a synchronisation means, and the controls for operating the apparatus in its successive phases.

Other features and advantages will be apparent from the following description and the drawings referring thereto, which are given by way of example.

Figure 4:
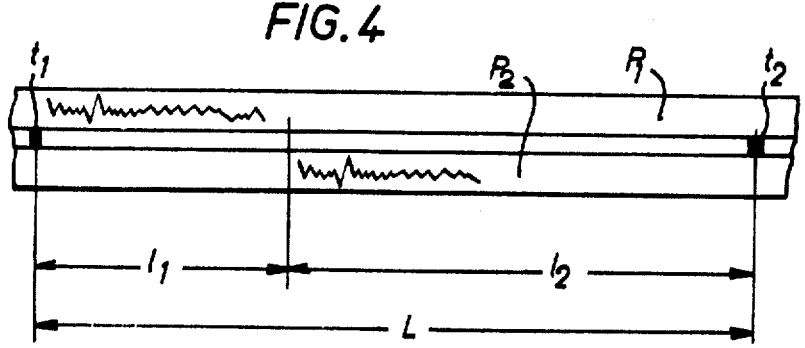
Figure 2:
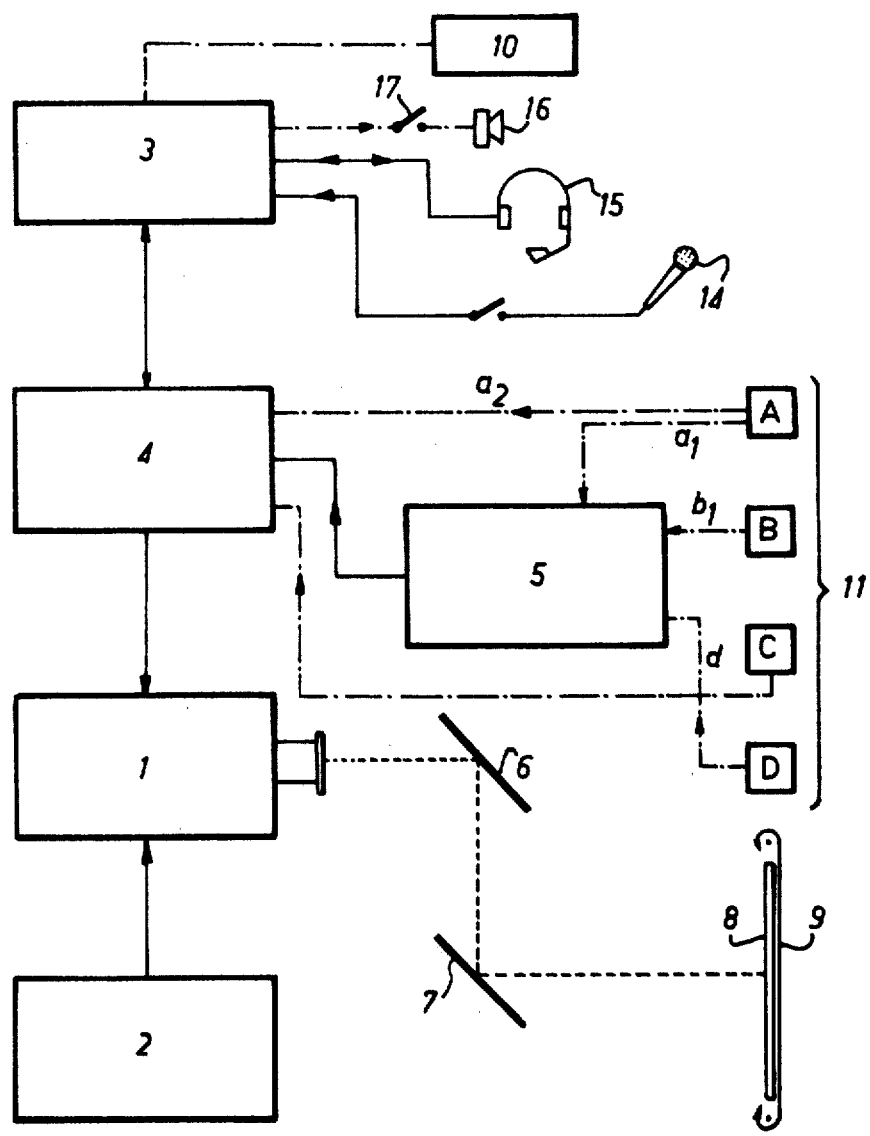
Figure 3:
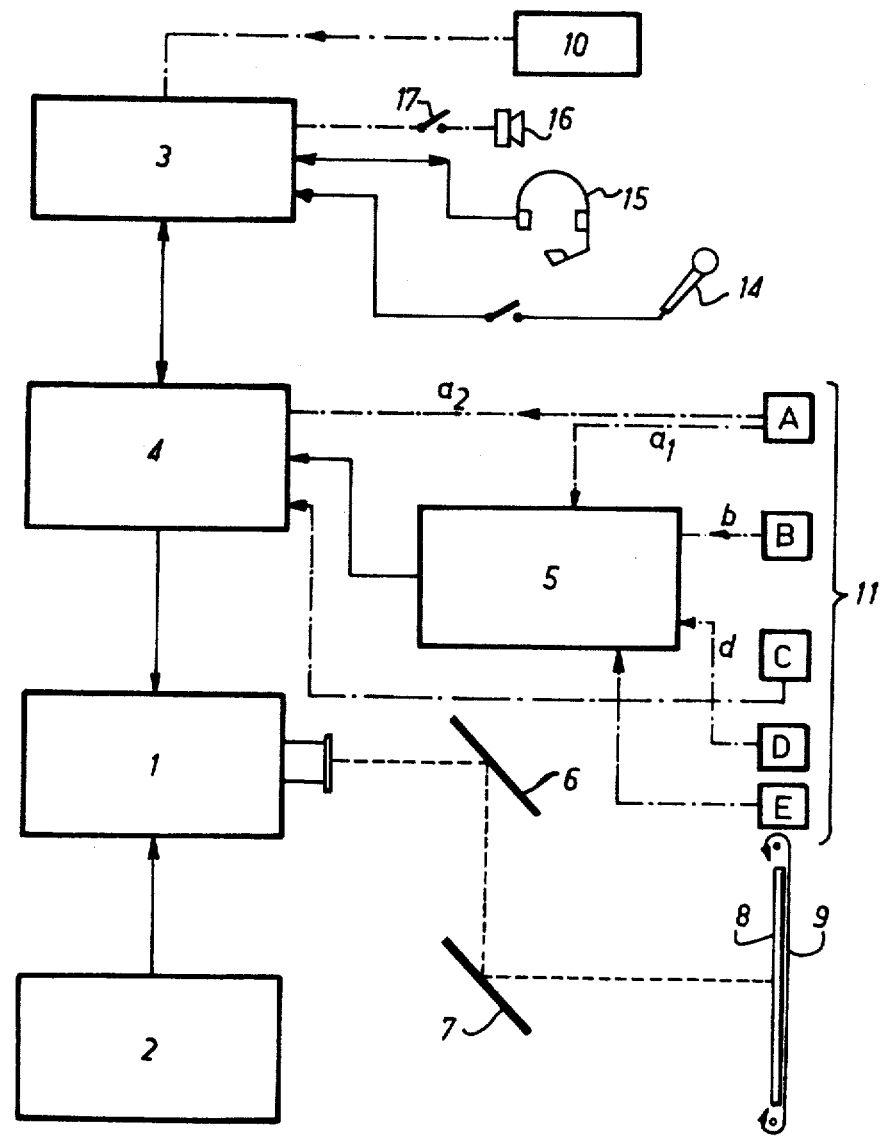
Figure 5A:
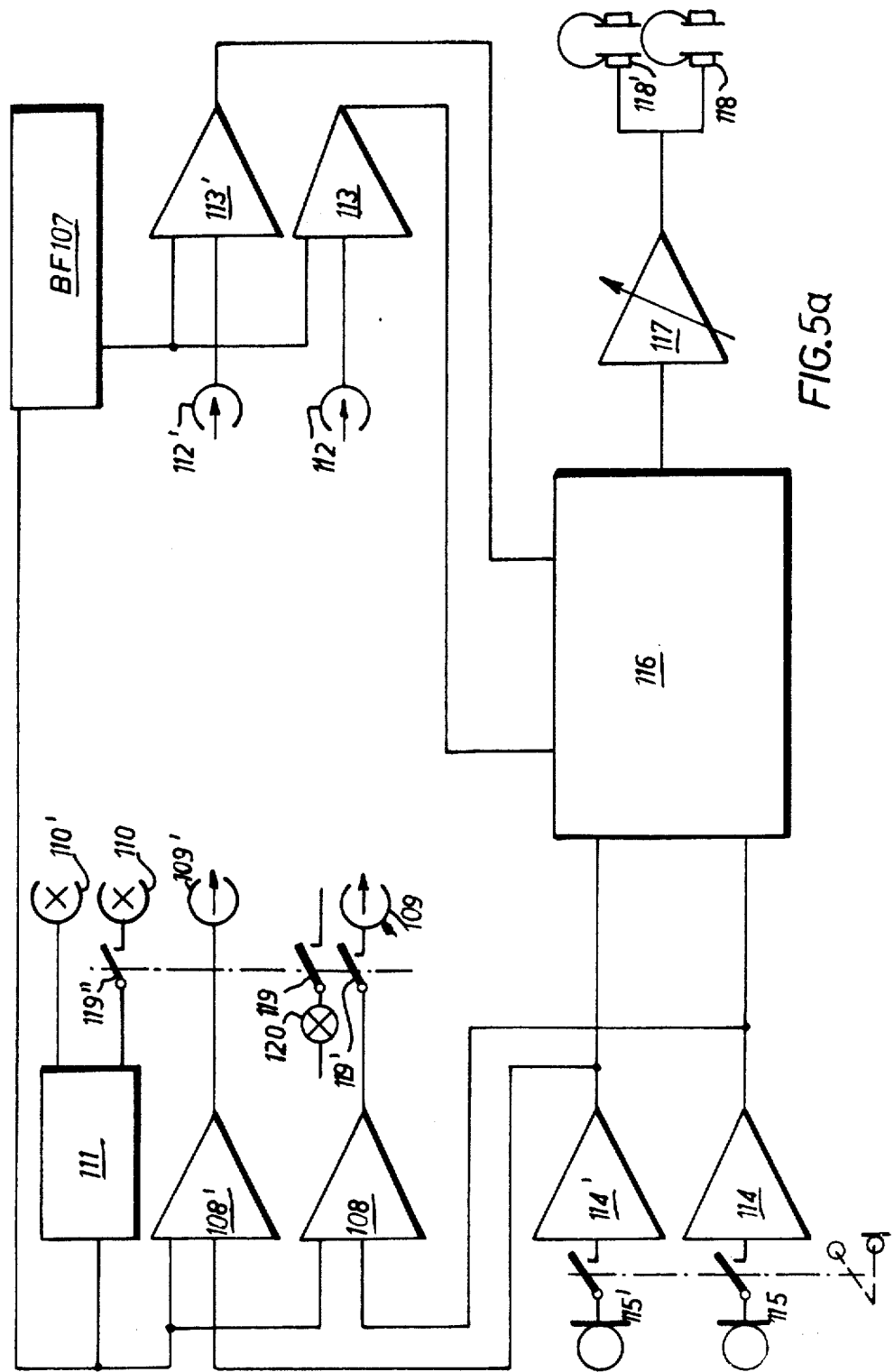
Figure 6:
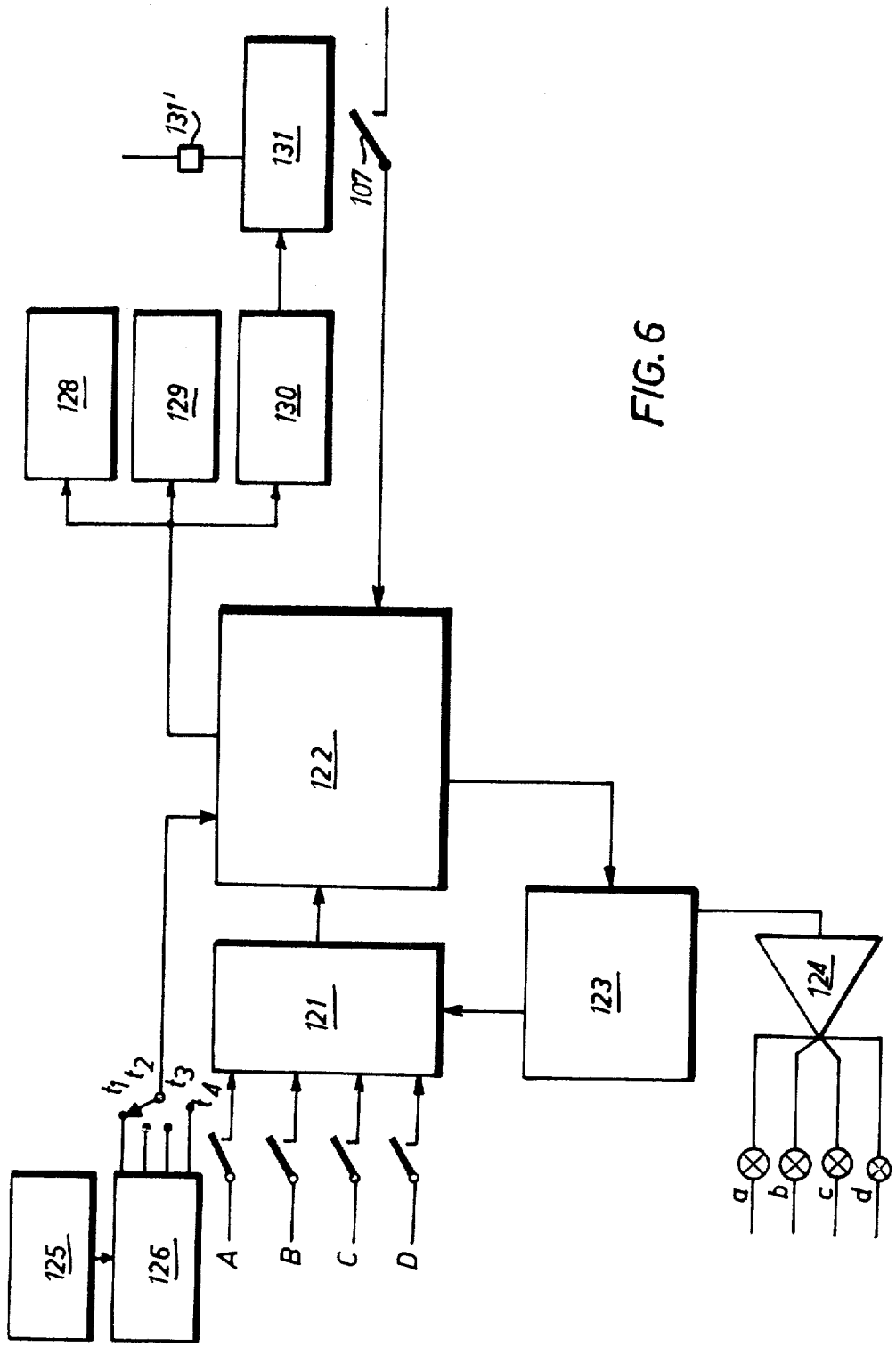
Figure 7:
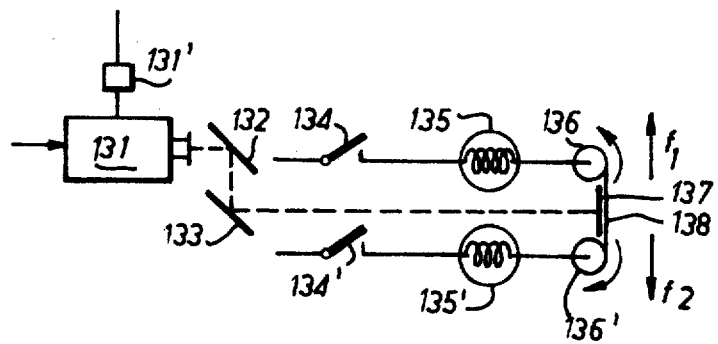
Figure 10:
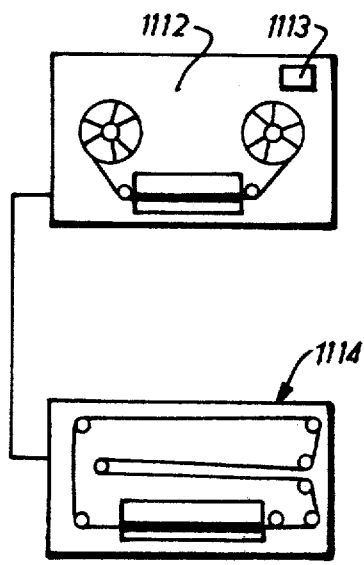
Figure 8:
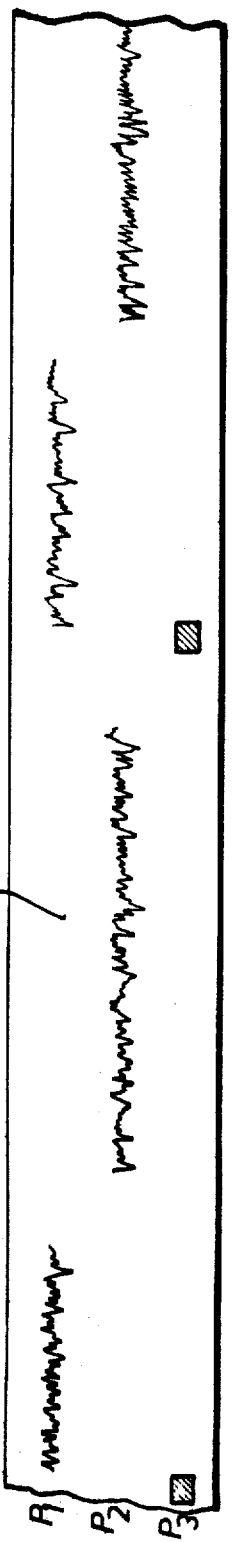
Figure 9:
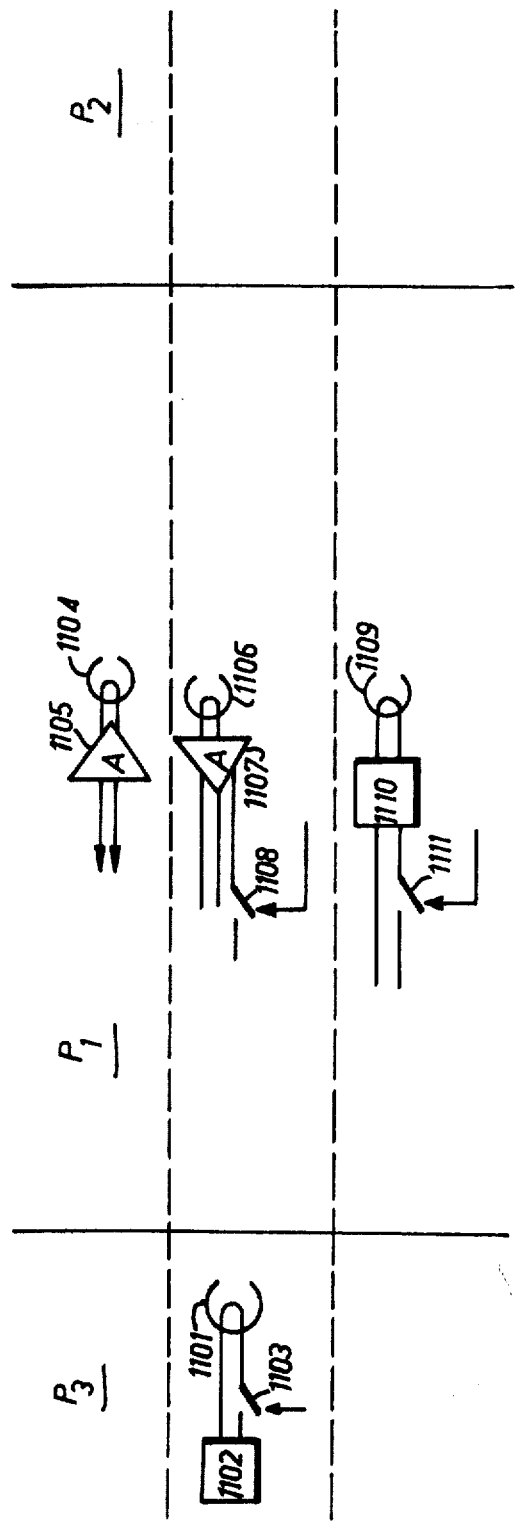

FIG. 1 shows an embodiment of the apparatus according to the invention,

FIG. 2 shows an operating diagram of a first embodiment of the apparatus according to the invention, FIG. 3 shows an operating diagram of a second embodiment of the apparatus according to the invention, FIG. 4 shows a part of the magnetic tape such as is used in the second embodiment, FIGS. 5 and 5a shows a block diagram of the audio part of the apparatus according to the invention, in a first mode of operation, FIG. 6 shows a block diagram of the video part of the apparatus according to the invention, in accordance with said first mode of operation, FIG. 7 diagrammatically shows the drive for the rollers for translucent paper, by means of electric motors, FIG. 8 shows the magnetic tape used for the second mode of operation, FIG. 9 diagrammatically shows the operation of the three tracks of the magnetic tape used for the second mode of operation, FIG. 10 concerns the use of two tape recorders, in the case where the means of the second mode of operation of the apparatus according to the invention are replaced by an animated film.

In FIGS. 2 and 3, the solid lines indicate operational connections, the dash-dotted lines indicate functional connections and the dotted lines indicate optical connections.

The apparatus comprises a working table T with two places. The right-hand place is that occupied by the pupil. A screen 8, which is preferably square, is set in the table. Positioned on the screen is a strip 9 of translucent paper mounted on two rollers, the front roller being actuated by a crank or a lever 12' for feeding the paper, and the rear roller being actuated by a crank 12" for returning the paper. By actuating the lever 12', this arrangement permits the part of the sheet of paper which has already been drawn upon, to be replaced by a fresh and clean surface. The projector 1 and its associated electronics are installed below the surface of the table T and the image is projected towards the screen by a set of mirrors. A projection mechanism 13 provides for good operation of the projector. Because of this, the pupil can draw the image and the corresponding script (word) which appear on the screen. The projector can also comprise an electronic means 2 for the automatic focussing thereof (see FIGS. 2 and 3).

It can therefore been seen that the apparatus according to the invention can be used in any teaching circumstances in which the pupil can use a pencil.

Arranged on the left-hand side of the screen are the control bottom 11 for the pupil. By way of example, FIG. 1 shows four control buttons A, B, C and D, the functions of which will be described hereinafter.

On the "teacher" side of the table, there is mounted in the table T a tape recorder 3 with its electronic mechanisms and its manual controls 10. Essentially, the manual controls can occupy a position for play back or recording, a neutral position, and a position for reading. A jack 14 for the teacher's microphone and a jack 15 for the microphone head-set (or for the microphone alone) of the pupil, are provided on the table.

FIG. 2 shows the operating diagram of a first embodiment of the apparatus accoding to the invention.

In the first operating phase, the tape recorder 3 is stopped.

The pupil then presses the control A which, by way of the connection $a_1$, obliterates the memory of the sequences selected in a previous cycle, and, by way of the connection $a_2$, sets the projector 1 operating, via the logic synchronisation means 4 between the projector 1 and the tape recorder 3. The object-word combinations i.e. slides or diapositives are projected onto the screen 8 by way of a set of mirrors 6 and 7. The pupil sees the diapositives pass before him by projection at regular intervals, which are pre-controllable for example between 15 and 30 seconds. The pupil then selects a certain number of images according to a criterion set by the teacher; for example, any images of which the corresponding script or word comprises a certain shape (a letter). Each time that the pupil selects an image, he presses the button B. By way of the connection $b_1$, the button B acts on the selected sequence memory 5 and provides for selection of the diapositive corresponding to the image selected by the pupil.

After this first phase, the pupil actuates the control C and returns the projector to its zero position.

During the second phase, the pupil successively calls up the preselected diapositives by acting on the projector by way of the control D, through the connection d and the memory 5. When the pupil presses the button D to call up the first selection, the projector, which is unilluminated, advances the diapositives which have not been selected, at an accelerated rate. At the moment at which the magazine containing the diapositives supplies the projector with the first diapositive selected, the projector is lit. The pupil then draws on the translucent paper what he sees on the screen: firstly the object and then the corresponding script or word. Having finished his drawing, the pupil calls up the following diapositive selected, by again actuating the control D, and so on until he reaches the last diapositive selected.

During this second phase, the tape recorder 3 is stopped.

For the third phase, the pupil again actuates the control C and returns the projector to the zero position. Subsequently, he actuates the control D to cause the image corresponding to the first slide (or diapositive) selected, to appear on the screen. The tape recorder 3 is then set in operation by the manual control 10. Using his microphone 14, the teacher records on a first track an instruction or a commentary concerning the image, and the pupil repeats it, his repetition being recorded by way of the microphone 15 on a second track of the magnetic tape. After these recordings, the tape recorder is stopped by manual control. The tape recorder is generally operated by the teacher. The pupil again presses the control button D to cause the image corresponding to the following dispositive selected, to appear on the screen. Again, an instruction from the teacher is recorded on a first track and the repetition of the instruction by the pupil is recorded on a second track. These operations are continued until the last diapositive (or slide) selected is reached.

The projector and the tape recorder are then returned to the zero position.

In the fourth phase of the cycle, the projector remains at zero, while the pupil listens to the instructions given by the teacher, and the repetitions by the pupil himself. For the purpose, the pupil can be provided with a head-set (microphone head-set 15) or can listen to a loud speaker 16 which is set in operation by the switch 17. During this fourth phase, the pupil therefore works only with the tape recorder.

The tracks of the tape recorder can be erasable.

The operating diagram of a second embodiment is shown in FIG. 3.

The pupil controls 11 comprise another button E for simultaneously actuating in synchronism the projector and the tape recorder, this control being involved only in the third operating phase.

In fact, phase 1 and phase 2 of operation of the second embodiment are identical to those described above. However, the instructions and commentaries given by the teacher for each slide have been recorded on a first track $P_1$ of the tape recorder (FIG. 4). A length L of tape is reserved between two marking pips $t_1$ and $t_2$ for each of the diapositives. A first part of the tape, of length $l_1$, defines the pre-recording of the teacher's instructions, and a second part $l_2$ of the tape is reserved for the repetitions by the pupil on the track $P_2$; the total length L must be the maximum admissible for making it possible for the pupil easily to record.

In the third phase, the projector having been returned to zero by the control button C, the pupil acts on the control button E which causes the projector and the tape recorder to be set in operation simultaneously and in synchronism by way of the memory 5 and the logic synchronisation means 4, until the first diapositive pre-selected is reached.

The feed as far as the first dispositive occurs at an accelerated rate; for example, one diapositive per second, the speed of the tape being increased in consequence. As soon as the first diapositive selected is reached and is projected onto the screen, the magnetic tape advances at the speed of normal reading during the part corresponding to the pre-recording of the teacher's instructions and during recording of the repetition by the pupil. At the end of this period, corresponding to the length L of the magnetic tape, the projector and the tape recorder may or may not stop, in order automatically to re-start at an accelerated rate in synchronism, until the next diapositive selected is reached, and so on, until the last diapositive selected is reached.

A supplementary control (not shown in the drawings) can be provided so that the pupil can possibly actuate the tape recorder, and again listen to his recording.

The fourth phase can correspond to that of the first embodiment; everything being returned to its zero position, the pupil starts the tape recorder and listens to the instructions given by the teacher, and his own repetitions; or, the phase can comprise the synchronised operation of the projector and the tape recorder on reproduction, by way of a loud speaker or a listening headset.

The "teacher" track cannot be erased.

The method and the apparatus according to the invention are in principle envisaged for the education of persons suffering from disturbances in written or spoken language, and can be put to many uses.

Some uses can be purely visual.

Most uses involve the tape recorder.

The embodiment comprising a tape recorder with a tape for two recording tracks and a synchronisation track can be put to many uses.

For example, assuming in fact that the apparatus is to be used not for re-education but for teaching a number of children to read and write, the second track is then reserved for recording, once and for all, the phrases spoken by the teacher. This recording cannot be erased (unless a special operation is performed), whereas the repetition by the pupil, which is recorded on the first track, can be erased, begun again, etc.

It can now be seen that the teacher, having made a recording during a lesson given to one pupil, can use the apparatus, once set up in this way, for a number of pupils in succession or simultaneously, if the tape reproduced and the negatives or diapositives are available for a number of apparatuses.

It is also possible to provide solutions which permit a teacher to monitor a number of apparatuses in operation from a central desk.

Two embodiments corresponding to two modes of operation will be described hereinafter:

The audio part of the apparatus corresponding to a first mode of operation essentially comprises (FIG. 5) a tape recorder having at least two tracks. The tape recorder is controlled by a keyboard comprising a key T for starting, a key U for recording (this key is provided with a luminous signal 105), a key R for rapid forward wind, a key Q for rapid back wind and a key S for stop. These keys act on a logic means 102 by way of a keyboard memory 101. In addition, a key P permits temporary stopping of the tape when recording or listening, as long as the key P is depressed, and a key V ensures rapid re-winding of a sequence, the latter re-starting in a forward direction as soon as the button is released. The two keys P and V act directly on the logic means 102.

The tape recorder is also provided with means 103 for detecting the end of the tape, by means of a photoelectric cell 104.

The logic means 102 acts on the one hand on the control of the motors 106 of the tape recorder and on the other hand on the low-frequency means 107 which controls recording, erasure and reproduction, as will be apparent from FIG. 5a.

The low-frequency means 107 controls the recording heads 109 and 109' of the two tracks, by way of recording amplifiers 108 and 108'. An erasure head 110 and 110' is provided for each of the tracks, connected through an oscillator 111. One of the tracks (109, 110 in FIG. 5a) is provided with a key-operated switch 119, 119' and 119" on the line of the recording head and the line of the erasure head. Th switch 119 is provided with an illuminatable signal 120 which is illuminated when the switch is closed. The switch 119, 119' and 119" permits recording on the two tracks and makes it possible for the recording on the track on which it is mounted, to be inerasable, by electronic blocking.

In operation, the track which is controllable in this way and which can be made inerasable is that used by the teacher, while the other track is that used by the pupil, as will be described hereinafter. Two microphones 116 and 115' provide, through amplifiers 114 and 114', for recording, but also for intercommunication between the two persons using the two tracks, by means of a mixer 116, an output amplifier 117 and listening means 118 and 118'. Listening to the recordings on one or other of the tracks is effected from reading heads 112 and 112', through reading amplifiers 113 and 113', the mixer 116, the output amplifier 117 and the listening means 118 and 118'.

The video part of the apparatus (FIG. 6) comprises a projector 131 for projecting negatives, diapositives or a film, the projector being actuated in such a way that the images are firstly projected sequentially onto a screen; after selection of a certain number of images, they are projected only by successive calls. Actuation is effected from a control table comprising a key A for the sequential display of the images, a key B for selecting the images, a key C for returning the projector to zero and a key D for successively calling up the selected images. When they are actuated, the keys act on a memory 121 connected to a means 122 for forming control signals. A presentation time selector 127 for selecting the presentation time when the images are passed in sequence across the screen, comprises an oscillator 125 and a division train 126.

In FIG. 6, there are four possible presentation times for the images, namely $t_1$, $t_2$, $t_3$, $t_4$, but it is obvious that any number of presentation times can be used. The data of the presentation time are supplied to the means 122. Four light signals $a$, $b$, $c$ and $d$ coact with the keys A, B, C and D, so that the signal which is lit always corresponds to the key which is to be operated. The signals $a$ to $d$ are actuated by a means 123 for detecting the phase of the programme, by way of an amplifier 124.

The detector 123 obtains its control signal by the means 122 for forming control signals, and it communicates with the memory 121. The means 122 transmits the control signals corresponding to the keys A, B, C and D, when the latter have been actuated, to the means 128 for memorising the selected images, to the counter 129 for counting the position of the negative or diapositive, and to the control 130 of the projector 131 proper. A manual focussing means 131' is provided for focussing the image on the screen 137 (see FIG. 7). An end-of-travel contact Z notifies the means 122 of the return to their original position of all the negatives or diapositives arranged in the magazine of the projector.

The projector 131 projects the image corresponding to the negative by way of a set of mirrors 132 and 133 onto a screen 137, for example of frosted glass. A sheet 138 of a translucent paper is arranged on the screen, to permit tracing of the image projected onto the screen. The sheet 138 of paper is wound on rollers 136 and 136' in one direction or the other, as indicated by the arrows $f_1$ or $f_2$, by the operation of electric motors 135 and 135' controlled by switch means 134 and 134' (see FIG. 7).

In operation of the apparatus, the teacher and the pupil sit one beside the other in front of the desk. Each is provided with a listening means and a microphone. The teacher operates the tape recorder, while the pupil operates the video part, in accordance with the instructions given by the teacher.

The first stage of a working cycle comprises causing the images to pass sequentially across the screen. The apparatus being connected to the power supply, the signal a corresponding to the key A (for displaying the images) is lit. The pupil then knows that he must depress the key A.

Generally, on each occasion the signal indicating the key which must be operated by the pupil is lit. Actuation of the keys for which a signal is not lit remains without effect, with the exception of the key C (return to zero) which operates at any moment whatever in the working cycle. actuated by a selection key.

This operation completed, the

The teacher gives instructions to the pupil, concerning selection of the images to be projected.

The pupil depresses the key A (to cause the images to pass across the screen). The signal of key B (selection) is lit. The images are projected sequentially onto the screen at time intervals $t_1$, $t_2$, $t_3$ or $t_4$, those intervals being pre-selected by means of the selector 127. The pupil then selects a certain number of negatives or diapositives having a common characteristic point. Each time that the pupil selects an image, he depresses the key B (selection). At the end of the series of negatives or diapositives in the magazine of the projector, or at each moment during projection, the pupil can depress the key C (return to zero). The magazine is then returned to its starting position in the projector 131. The signal indicating the key D (successive calls) is lit.

When the key D is depressed, the negatives or diapositives selected are called up in the order of their selection. Each selected diapositive remains projected onto the screen 137 until the pupil again depresses the key D and calls on the next diapositive selected.

After having called the first diapositive selected, the pupil receives from the teacher instructions which are also recorded on the teacher track of the tape recorder. The pupil traces onto the sheet 138 of paper the drawing and the script represented on the diapositive projected onto the screen 137; he repeats the instructions given by the teacher, and replies. Repetition and reply by the pupil are recorded on the pupil track of the tape recorder. The pupil can listen to the recording of the reply by the teacher and his reply, and can become aware of any errors he has made. He can compare the tracing which he made with the drawing shown on the negative or diapositive, by extinguishing the light of the projector. This can be effected for example by a switch completed, the pupil advances the sheet of paper by winding it onto the roller 136, for example by actuating the switch 134 of the motor 135.

He then calls up the next image selected, by again depressing the key D.

Many improvements and modifications can be envisaged. Thus, in some cases, it may be of advantage for the screen to be inclined with respect to the horizontal, and even arranged vertically.

The apparatus according to the second mode of operation is described hereinafter.

The second mode of operation concerns a synchronised version of the apparatus according to the invention (FIGS. 8 and following).

The tape recorder has a third track referred to as a "synchronisation track." FIG. 8 shows that the magnetic tape BM comprises three tracks: $P_1$, $P_2$ and $P_3$. The track $P_1$ serves for recording and/or reproduction of the teacher's instructions, the track $P_2$ is used for the pupil, and the track $P_3$ is the synchronisation track. The synchronisation track $P_3$ is read by a separate reading head which receives the synchronisation marking pips and which, after amplification, acts on the system for feeding the diapositives mounted in the projector. Marking of the synchronisation pips is effected from a separate recording head 1101. The "pips," are obtained from a special oscillator 1102. In FIG. 9, for the track $P_3$, in the "recording" box, there is shown the marking system which is also provided with a pips marker 1103 provided with a key. The oscillator 1102 can be actuated by the teacher when he is preparing the soft-ware, that is to say, his instructions.

The reading system as illustrated, as regards the track $P_1$ in FIG. 9, comprises a reading head 1104 which acts on an amplifier 1105 connected to the listening means. The reading system is the same as regards the tracks $P_2$ and $P_3$.

The recording system for the track $P_1$ (that is to say, for the teacher track) comprises a recording head 1106 which is acted upon by an amplifier 1107 connected to the microphone (not shown). A recording lock 1108 is provided.

The recording system for the track $P_2$ is the same as that for the track $P_1$, but without recording lock.

As described above, there is for the synchronisation track $P_3$ a separate recording head 1101.

The erasure system for the track $P_1$ comprises an erasure head 1109 connected to an erasure oscillator 1110 and an erasure lock 1111. The same erasure system is used for the track $P_3$; and also for the track $P_2$ (the pupil track), but without an erasure lock.

Synchronisation permits the image to appear in total synchronism with the beginning of the recorded commentary, and permits projection of the image to be maintained throughout the commentary. It is the synchronisation pip which causes the image to appear. In practice, it is simpler for the end-of-sequence pip to stop the movement of the tape, which re-starts on the following diapositive as soon as the starting button is actuated. Each new pip as read on the third track $P_3$ causes a new image to appear. The commentary (or instruction) text is recorded on the track $P_1$ and the pip is always located at the beginning of the text of the commentary given by the teacher (track $P_1$). In other words, the synchronisation pip which immediately preceeds the commentary triggers presentation of the image before listening to the commentary given by the teacher.

As can be seen, changing of the image occurs automatically, either with or without intervention by the pupil, at the beginning of each commentary sequence.

In fact, the pip following the commentary, which is located thereafter, plus a certain delay time intended for repetition of the commentary by the pupil, triggers the next image, and so on.

Synchronisation can be ensured in both directions of operation, either for normal movement or for rewinding. It is generally sufficient and more economical for re-winding to be limited to one sequence. Thus, the pupil can see an image again at any moment, and listen again to the commentary relating thereto, by the usual operation of the keyboard of the tape recorder.

Finally, synchronisation to an animated film is also possible by the application, after development of a film, of a 3 mm layer of magnetic track on respective sides of the film.

The recording and reading heads for the teacher and pupil tracks are of a particular conception, in that they are adapted to reading two tracks separated by the image. Synchronisation in this case is effected mechanically, because of the material connection between the film and the magnetic tracks. This synchronisation operates equally in the forward and in the rearward directions of operation.

An optional continuous-loop device permits repetition of the commentary of the last seconds (this space of time being adjustable) for the case in which the film would be stopped at a fixed image.

This device, which is separate from the main tape recorder, permits repetition of the commentary by the teacher as often as is desired; it also permits repetition of the pupil on the pupil track. FIG. 10 shows the arrangement of this device.

The main tape recorder 1112 is provided with a repetition key 1113. The tape recorder 1112 co-operates with a continuous-loop tape recorder 1114. There is also provided a memory having a capacity of from 10 to 15 seconds (for example 10 to 15 seconds correspond approximately to 30 to 40 spoken words). If the pupil wants to repeat a given phrase a number of times, he presses the repetition button 1113.

At that moment, the main tape recorder records the phrase in question on the continuous-loop tape recorder 1114. It can therefore been seen that the provision of a continuous loop permits repetition as frequently as may be desired of the phrase or instruction in question. To return to the main tape recorder 1112 and to continue the information sequences, it is sufficient to depress the key 1113 a second time.

Many improvements and modifications can be made without thereby departing from the scope of the invention.

We claim:

1. A scripto audio-visual educational apparatus comprising a slide projector, a screen on which images of the slides can be projected, a tape recorder having at least two tracks, means for operating said tape recorder in synchronism with said projector, means for memorizing selected slides and acting on said projector and on said tape recorder, means including controls for operating the apparatus in successive stages, a roll of translucent paper, said translucent paper being arrangeable on said screen, and means independent of said projector and tape recorder for winding said translucent paper in one direction or the other on said screen, whereby the paper is adapted for reception of student written or drawn responses, the latter means including motors and switch means controlling said motors.

2. Apparatus as claimed in claim 1, wherein said controls include a first control means for the selection of selected slides, a second control means for calling the selected slides one by one, a third control means to erase all memory of selected slides from a previous operation and to advance the slides one by one, and a fourth control means for placing the projector and the tape recorder in zero position.

3. Apparatus as claimed in claim 2, further comprising means for the formation of control signals for the duration of presentation of the slides at the time of their sequential advance.

4. Apparatus as claimed in claim 1, said controls further comprising a fifth control means for selectively effecting the projector-tape recorder synchronization.

5. Apparatus as claimed in claim 1, wherein the screen is square.

* * * * *